(12) United States Patent
Saboo

(10) Patent No.: US 12,146,641 B2
(45) Date of Patent: Nov. 19, 2024

(54) ROTATING LIGHT

(71) Applicant: West Coast Imports, Inc., Commerce, CA (US)

(72) Inventor: Vinay Saboo, Commerce, CA (US)

(73) Assignee: WEST COAST IMPORTS, INC., Commerce, CA (US)

( * ) Notice: Subject to any disclaimer, the term of this patent is extended or adjusted under 35 U.S.C. 154(b) by 0 days.

(21) Appl. No.: 18/217,917

(22) Filed: Jul. 3, 2023

(65) Prior Publication Data

US 2023/0341118 A1 Oct. 26, 2023

Related U.S. Application Data

(63) Continuation of application No. 17/895,559, filed on Aug. 25, 2022, now Pat. No. 11,692,695, which is a continuation of application No. 17/296,579, filed as application No. PCT/US2019/063330 on Nov. 26, 2019, now Pat. No. 11,428,390.

(60) Provisional application No. 62/804,549, filed on Feb. 12, 2019.

(51) Int. Cl.
| | |
|---|---|
| *F21V 21/30* | (2006.01) |
| *F21S 9/03* | (2006.01) |
| *F21V 23/04* | (2006.01) |
| *F21Y 115/10* | (2016.01) |

(52) U.S. Cl.
CPC .............. *F21V 21/30* (2013.01); *F21S 9/037* (2013.01); *F21V 23/0471* (2013.01); *F21Y 2115/10* (2016.08)

(58) Field of Classification Search
CPC ................................ F21S 9/037; F21V 21/30
See application file for complete search history.

(56) References Cited

U.S. PATENT DOCUMENTS

| | | |
|---|---|---|
| D86,734 S | 4/1932 | Mitchell |
| 2,248,598 A | 7/1941 | Yoder |
| 2,653,784 A | 2/1949 | Wasselle |

(Continued)

FOREIGN PATENT DOCUMENTS

| | | |
|---|---|---|
| CA | 3121315 A1 | 6/2020 |
| CN | 3220172 | 1/2002 |

(Continued)

OTHER PUBLICATIONS https://www.amazon.com/Brilliant-Evolution-Wireless-Control-Lighting/dp/B01JTA4QXI/ref=sr_1_1?crid=1EZZYFPVU7UHM&keywords=b01jta4qxl&qid=1669843632&sprefix=b01jta4qxi%2Caps%2C37&sr=8-1&th=1.

(Continued)

*Primary Examiner* — Karabi Guharay
(74) *Attorney, Agent, or Firm* — Aasheesh V. Shravah; CM Law

(57) ABSTRACT

Exemplary embodiments of a light set are provided, including a light portion having a body portion configured to retain one or more batteries, a printed circuit board within the body portion containing one or more light-emitting diodes, and a first projection and a second projection extending outward from an outer surface of the body portion. A holder is provided for holding the light portion, including a rear portion, a left wing extending from and perpendicular to the rear portion, the left wing having an outer wall and an inner wall, and a right wing extending from and perpendicular to the rear portion, the right wing having an outer wall and an inner wall.

20 Claims, 15 Drawing Sheets

(56) References Cited

U.S. PATENT DOCUMENTS

| | | |
|---|---|---|
| 3,060,400 A | 10/1962 | Pistey |
| D215,481 S | 9/1969 | Dietz |
| D265,176 S | 6/1982 | Bock |
| D282,491 S | 2/1986 | Doyel |
| 4,888,670 A | 12/1989 | Sharrah |
| D324,924 S | 3/1992 | Bengochea |
| 5,205,643 A | 4/1993 | Lin |
| D346,821 S | 5/1994 | Smith |
| 5,765,683 A | 6/1998 | Starkle |
| D415,297 S | 10/1999 | Chung |
| D437,955 S | 2/2001 | Tang |
| D447,587 S | 9/2001 | Poon |
| D464,455 S | 10/2002 | Fong et al. |
| D475,479 S | 6/2003 | Lin |
| D476,105 S | 6/2003 | Alsobrook |
| D476,439 S | 6/2003 | O'Rourke |
| D482,484 S | 11/2003 | Benghozi |
| D484,270 S | 12/2003 | Yiu |
| D544,117 S | 6/2007 | Coushaine |
| D544,618 S | 6/2007 | Coushaine |
| D547,483 S | 7/2007 | Pickett |
| 7,264,372 B2 | 9/2007 | Maglica |
| D556,938 S | 12/2007 | Russello et al. |
| D558,386 S | 12/2007 | Bickler et al. |
| D567,987 S | 4/2008 | Khubani |
| D568,516 S | 5/2008 | Hillard |
| D581,081 S | 11/2008 | Mier-Langner |
| D582,593 S | 12/2008 | Cheng |
| D583,967 S | 12/2008 | Leunis |
| D583,981 S | 12/2008 | Meyer et al. |
| D583,982 S | 12/2008 | Meyer et al. |
| D583,983 S | 12/2008 | Meyer et al. |
| D588,291 S | 3/2009 | VanderWoude |
| D596,336 S | 7/2009 | Sabernig |
| 7,562,995 B1 | 7/2009 | Levine |
| D598,595 S | 8/2009 | Levine |
| D599,947 S | 9/2009 | Sabernig |
| D601,444 S | 10/2009 | Jones et al. |
| D602,185 S | 10/2009 | Chang |
| D607,600 S | 1/2010 | Keit |
| D612,970 S | 3/2010 | Sharrah et al. |
| D621,081 S | 8/2010 | Abernethy et al. |
| D628,323 S | 11/2010 | Matthews et al. |
| D628,324 S | 11/2010 | Matthews et al. |
| D630,368 S | 1/2011 | de Rijck |
| D633,240 S | 2/2011 | Cheng |
| D633,644 S | 3/2011 | Sprengers |
| D637,751 S | 5/2011 | Chiu |
| D640,815 S | 6/2011 | Yamada et al. |
| 7,969,076 B2 | 6/2011 | Liu et al. |
| D641,518 S | 7/2011 | Van den Akker |
| D646,821 S | 10/2011 | Wauters |
| D646,824 S | 10/2011 | Bembridge |
| D656,657 S | 3/2012 | Wauters |
| D657,090 S | 4/2012 | Kaule et al. |
| 8,162,502 B1 | 4/2012 | Zadro |
| D663,470 S | 7/2012 | Ruiz |
| D663,880 S | 7/2012 | Janssen |
| D664,698 S | 7/2012 | Meise et al. |
| D667,985 S | 9/2012 | Gielen |
| D674,944 S | 1/2013 | Bertken |
| D676,598 S | 2/2013 | Davidson |
| D676,992 S | 2/2013 | Trude |
| D676,999 S | 2/2013 | Morgan |
| 8,393,755 B2 | 3/2013 | Chien |
| D682,451 S | 5/2013 | Hardy |
| D689,648 S | 9/2013 | Silver |
| D692,611 S | 10/2013 | Silver |
| 8,636,377 B2 | 1/2014 | Cao et al. |
| D708,378 S | 7/2014 | Recker et al. |
| 8,770,770 B2 | 7/2014 | Shew et al. |
| D711,034 S | 8/2014 | Sturgis et al. |
| D718,286 S | 11/2014 | Yang |
| 8,896,208 B2 | 11/2014 | Shew |
| 8,956,013 B1 | 2/2015 | Shew |
| D734,518 S | 7/2015 | Zimmermann |
| D740,474 S | 10/2015 | Pineau |
| 9,271,367 B2 | 2/2016 | Ivey et al. |
| D757,307 S | 5/2016 | Wallach |
| D759,877 S | 6/2016 | Hewitt et al. |
| 9,395,052 B1 | 7/2016 | Shew |
| D765,903 S | 9/2016 | Zhang et al. |
| D766,480 S | 9/2016 | Bo |
| D768,322 S | 10/2016 | Feustel et al. |
| D777,367 S | 1/2017 | Ma |
| 9,605,836 B2 | 3/2017 | Sharrah et al. |
| D788,344 S | 5/2017 | Gecchelin |
| D796,098 S | 8/2017 | Grandadam |
| 9,719,658 B2 | 8/2017 | Maglica et al. |
| 9,759,391 B1 | 9/2017 | Shew |
| D801,574 S | 10/2017 | Amato et al. |
| D808,565 S | 1/2018 | Ambrozus |
| 9,857,038 B2 | 1/2018 | Coakley et al. |
| D810,354 S | 2/2018 | Farnsworth |
| D812,178 S | 3/2018 | Galli |
| D814,930 S | 4/2018 | Treyayne et al. |
| 9,984,600 B1 | 5/2018 | Daly |
| 10,006,614 B2 | 6/2018 | Cramer |
| D823,510 S | 7/2018 | Kunzendorf |
| D828,606 S | 9/2018 | Johnson |
| D831,268 S | 10/2018 | Johnson |
| 10,145,516 B2 | 12/2018 | Thiel |
| 10,174,918 B2 | 1/2019 | Li |
| D840,070 S | 2/2019 | Cramer |
| D840,582 S | 2/2019 | Liu |
| 10,197,224 B1 | 2/2019 | Macais |
| D852,397 S | 6/2019 | Medvec |
| 10,309,590 B2 | 6/2019 | Hollinger |
| 10,309,596 B2 | 6/2019 | Simmons |
| D857,261 S | 8/2019 | Xie |
| D857,268 S | 8/2019 | Worman |
| D857,960 S | 8/2019 | Worman |
| D867,625 S | 11/2019 | Khubani |
| D871,944 S | 1/2020 | Pennebaker, III |
| D884,947 S | 5/2020 | Tang et al. |
| D887,063 S | 6/2020 | Speier |
| D887,064 S | 6/2020 | Speier |
| D888,021 S | 6/2020 | Telle |
| D891,675 S | 7/2020 | Liu |
| D893,083 S | 8/2020 | Cornelissen |
| D899,656 S | 10/2020 | Saboo |
| D909,646 S | 2/2021 | Saboo |
| D932,679 S | 10/2021 | Johnson |
| 11,428,390 B2 | 8/2022 | Saboo |
| 11,692,695 B2 * | 7/2023 | Saboo ............ F21V 21/30 |
| | | 362/191 |
| 2002/0137374 A1 | 9/2002 | O'Rourke et al. |
| 2003/0072150 A1 | 4/2003 | Rizkin et al. |
| 2006/0012996 A1 | 1/2006 | Tseng |
| 2006/0083009 A1 | 4/2006 | Hsu |
| 2008/0013307 A1 | 1/2008 | Kang |
| 2009/0154151 A1 | 6/2009 | Levine |
| 2009/0196034 A1 | 8/2009 | Gherardini et al. |
| 2009/0261706 A1 | 10/2009 | Sorella et al. |
| 2011/0261568 A1 | 10/2011 | Dalsgaard |
| 2013/0010459 A1 | 1/2013 | Wilson |
| 2013/0051008 A1 | 2/2013 | Shew |
| 2013/0335944 A1 | 12/2013 | Battis et al. |
| 2015/0084540 A1 | 3/2015 | Maglica et al. |
| 2017/0074498 A1 | 3/2017 | Inscore |
| 2018/0058637 A1 | 3/2018 | Thiel |
| 2020/0363021 A1 | 11/2020 | Feit et al. |

FOREIGN PATENT DOCUMENTS

| | | |
|---|---|---|
| CN | 201434216 Y | 3/2010 |
| CN | 201487778 U | 5/2010 |
| CN | 301695783 S | 10/2011 |
| CN | 301778588 S | 12/2011 |
| CN | 301787817 S | 1/2012 |
| CN | 301854766 S | 3/2012 |
| CN | 301979679 S | 7/2012 |
| CN | 203115529 U | 8/2013 |
| CN | 302664669 S | 11/2013 |

(56) References Cited

FOREIGN PATENT DOCUMENTS

| | | |
|---|---|---|
| CN | 302737556 S | 2/2014 |
| CN | 302827314 S | 5/2014 |
| CN | 302897126 S | 7/2014 |
| CN | 203823581 U | 9/2014 |
| CN | 303109475 S | 2/2015 |
| CN | 204314069 U | 5/2015 |
| CN | 303278712 S | 7/2015 |
| CN | 303332260 S | 8/2015 |
| CN | 204647991 U | 9/2015 |
| CN | 303512223 S | 12/2015 |
| CN | 304007722 S | 1/2017 |
| CN | 206164907 U | 5/2017 |
| CN | 304141152 S | 5/2017 |
| CN | 206222102 U | 6/2017 |
| CN | 304237106 S | 8/2017 |
| CN | 304652922 S | 5/2018 |
| CN | 304754103 S | 7/2018 |
| CN | 208431597 U | 1/2019 |
| EM | 000322110-0010 | 4/2005 |
| EM | 000332861-0003 | 4/2005 |
| EM | 003099175-0029 | 4/2016 |
| EM | 003356294-0016 | 8/2016 |
| EM | 005629003-0001 | 9/2018 |
| EP | 3153767 B1 | 12/2018 |
| JP | D1145154 | 7/2002 |
| JP | D1498517 | 6/2014 |
| JP | D1513428 | 12/2014 |
| JP | 305241710 S | 7/2019 |
| JP | 305262032 S | 7/2019 |
| KR | 300407030 | 2/2006 |
| KR | 101674320 B1 | 11/2016 |

OTHER PUBLICATIONS

International Search Report dated Feb. 12, 2020.
Request for Ex Parte Reexamination in U.S. Pat. No. 11,692,695.
Request for Ex Parte Reexamination in U.S. Pat. No. 11,428,390.

\* cited by examiner

ROTATING LIGHT

CROSS-REFERENCE TO RELATED APPLICATIONS

This application is a Continuation of and claims benefit to U.S. Ser. No. 17/895,559 filed on Aug. 25, 2022, entitled "Rotating Light", which is a Continuation of and claims benefit to U.S. Ser. No. 17/296,579 filed on May 25, 2021, entitled "Rotating Light", which relates to and claims priority from International Application No. PCT/US19/63330, filed on Nov. 26, 2019, entitled "Rotating Light", U.S. Provisional Patent Application Ser. No. 62/804,549 filed Feb. 12, 2019, U.S. Design Pat. No. D909,646, issued Feb. 2, 2021, and U.S. Design Pat. No. D899,656, issued Oct. 20, 2020, the entire disclosures of which are hereby incorporated herein by reference.

FIELD OF THE DISCLOSURE

The present disclosure relates to exemplary embodiments of a rotating light, and more particularly, to exemplary embodiments of a rotating light that can be provided within a holder.

BACKGROUND INFORMATION

Various lights can be provided as accessory lights, such as those used for accent lighting. The lighting can be portable or stationary. The present disclosure relates to a rotating light that can be portable and used as accent lighting or for other lighting purposes.

SUMMARY OF EXEMPLARY EMBODIMENTS OF THE DISCLOSURE

Exemplary embodiments of the present disclosure can provide for a rotating light, where a cover portion of the rotating light can be turned in one direction to turn the light on and in an opposite direction to turn the light off. A holder can be provided to retain the rotating light within the holder.

For example, in some exemplary embodiments, a light apparatus is provided, comprising a circular body portion configured to retain one or more batteries, a circular cover portion threadably secured to the circular body portion and having a transparent enclosure, a printed circuit board placed between the circular body portion and circular cover portion containing one or more light-emitting diodes configured to project light from the transparent enclosure, and a tension spring placed between the circular body portion and circular cover portion that provides tension between the circular body portion and circular cover portion, and pushes the circular cover portion away from the circular body portion, wherein rotation of the circular cover portion completes an electrical circuit to turn the one or more light emitting diodes on.

In some exemplary embodiments, the one or more batteries can be positioned at least partly in the tension spring and adjacent the printed circuit board to complete the electrical circuit to turn the one or more light emitting diodes on. In some exemplary embodiments, rotation of the circular cover portion pushes the printed circuit board and batteries into the tension spring to complete the electrical circuit.

In some exemplary embodiments, the light apparatus can further comprise a plurality of stubs provided around a circumference of the circular cover portion. The light apparatus can further comprise a first protrusion extending outward from an outer surface of the circular body portion, and a second protrusion extending outward from an outer surface of the circular body portion, the second protrusion being diametrically opposite to the first protrusion. The first and second protrusion can comprise a top wall and adjacent side walls to the top wall, where a middle portion of the top wall of the first and second protrusions is substantially flush with the circular body portion, and a left and right portion of the top wall and the side walls extend outward of the circular cover portion.

In some exemplary embodiments, the light apparatus can further comprise a first projection extending outward from an outer surface of the circular body portion, and a second projection extending outward from an outer surface of the circular body portion, the second protrusion being diametrically opposite to the first protrusion. The first and second projections can have a substantially cylindrical body and a flat top portion. The first projection can be between the first and second protrusions and the second projection can be between the first and second protrusions.

In some exemplary embodiments, the light apparatus can further comprise one or more solar panels provided on an outer surface of the circular cover portion that provide power to the one or more batteries. The light apparatus can further comprise a motion sensor provided on an outer surface of the circular cover portion to turn the one or more light-emitting diodes on when motion is detected. The light apparatus can further comprise a light sensor provided on an outer surface of the circular cover portion to turn the one or more light-emitting diodes on when a level of light reaches a predetermined threshold.

In some exemplary embodiments, the light apparatus can further comprise a hook provided on a rear portion of the circular body portion, and a recess shaped in the form of a hook on the rear portion of the circular body portion, wherein the hook can be folded into the recess so the hook is substantially flush with the rear portion of the circular body portion, and the hook can be folded outward to hook the light apparatus on a wall, such that the hook and the circular light would be substantially flush with the wall.

In some exemplary embodiments, a light set is provided, comprising a light portion comprising a body portion configured to retain one or more batteries, a cover portion secured to the body portion and having a transparent enclosure, a printed circuit board placed between the body portion and cover portion containing one or more light-emitting diodes configured to project light from the transparent enclosure, a first projection extending outward from an outer surface of the body portion, and a second projection extending outward from an outer surface of the body portion, the second protrusion being diametrically opposite to the first protrusion, and the light set further comprises a holder for holding the light portion, comprising a rear portion, a left wing extending from and perpendicular to the rear portion, the left wing having a first recess, and a right wing extending from and perpendicular to the rear portion, the right wing having a second recess, wherein the first projection is secured to the first recess and the second projection is secured to the second recess to hold the light portion within the holder.

In some exemplary embodiments, the light set can further comprise an adhesive including a removable film provided on the rear portion of the holder. A distance can be provided between the body portion of the light portion and the rear portion of the holder such that the light portion can turn when positioned within the holder. The light portion can turn up to 45 degrees on either side when positioned within the holder. The first and second projections can comprise cylindrical bodies that fit within the first and second recesses, respectively. In some exemplary embodiments, rotation of the cover portion in a first direction turns the one or more light-emitting diodes on and rotation of the cover portion in a second direction turns the one or more light-emitting diodes off.

In some exemplary embodiments, the light set can further comprise one or more solar panels provided on an outer surface of the circular cover portion that provide power for the one or more light-emitting diodes.

BRIEF DESCRIPTION OF THE DRAWINGS

The foregoing and other objects of the present disclosure will be apparent upon consideration of the following detailed description, taken in conjunction with the accompanying drawings, and claims, in which like reference characters refer to like parts throughout, and in which:

Figure 1:
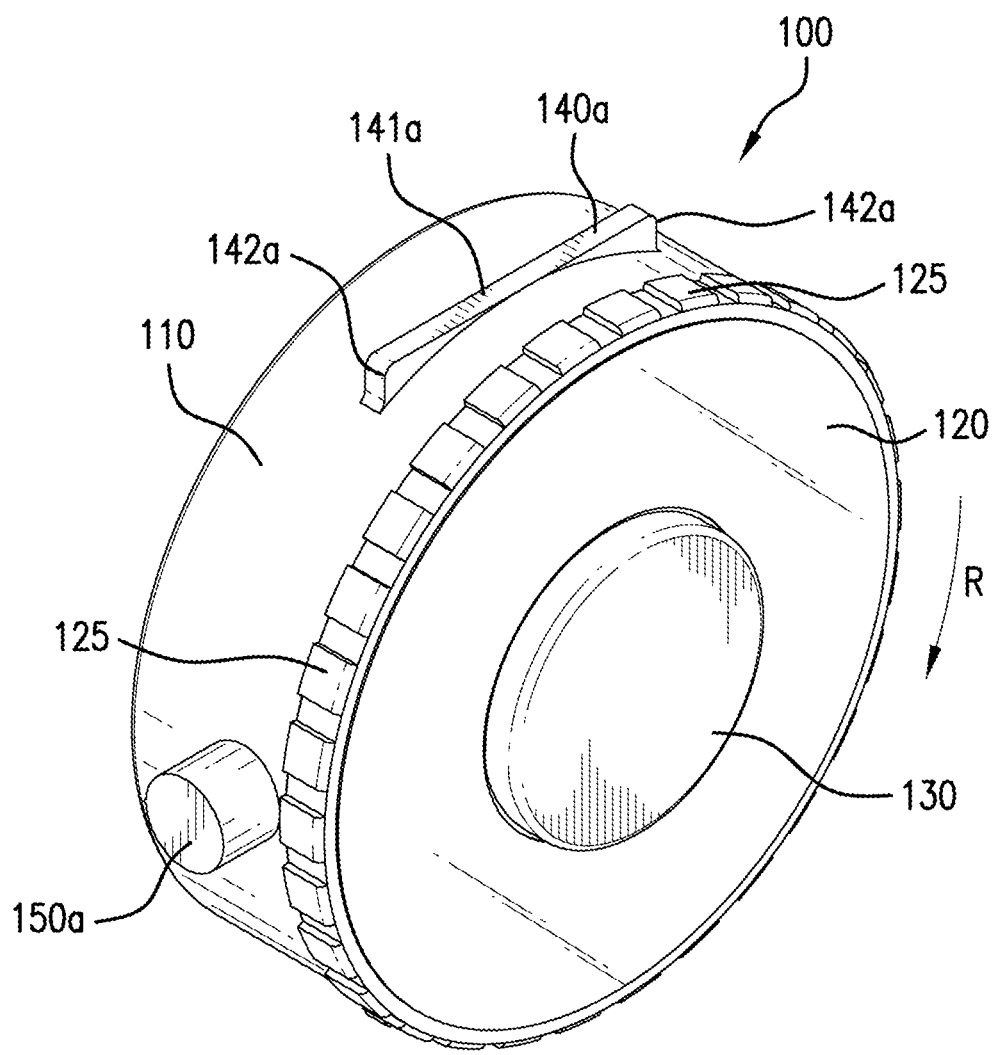
FIG. 1 is a front perspective view of a rotating light according to an exemplary embodiment of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure.

DETAILED DESCRIPTION OF EXEMPLARY EMBODIMENTS OF DISCLOSURE

The exemplary embodiments of the present disclosure can provide for a rotating light that can be secured within a holder. The rotating light can be turned on and off by rotating a top surface of the rotating light. The rotating light turns within the holder to shift a direction of light, and can be removable from the holder. The holder can be applied or attached to various surfaces as needed.

Exemplary embodiments of the various methods and apparatuses will now be described with reference to the figures. The following description of the various embodiments is merely exemplary in nature and is in no way intended to limit the scope of the disclosure, its application, or uses.

Figure 2:
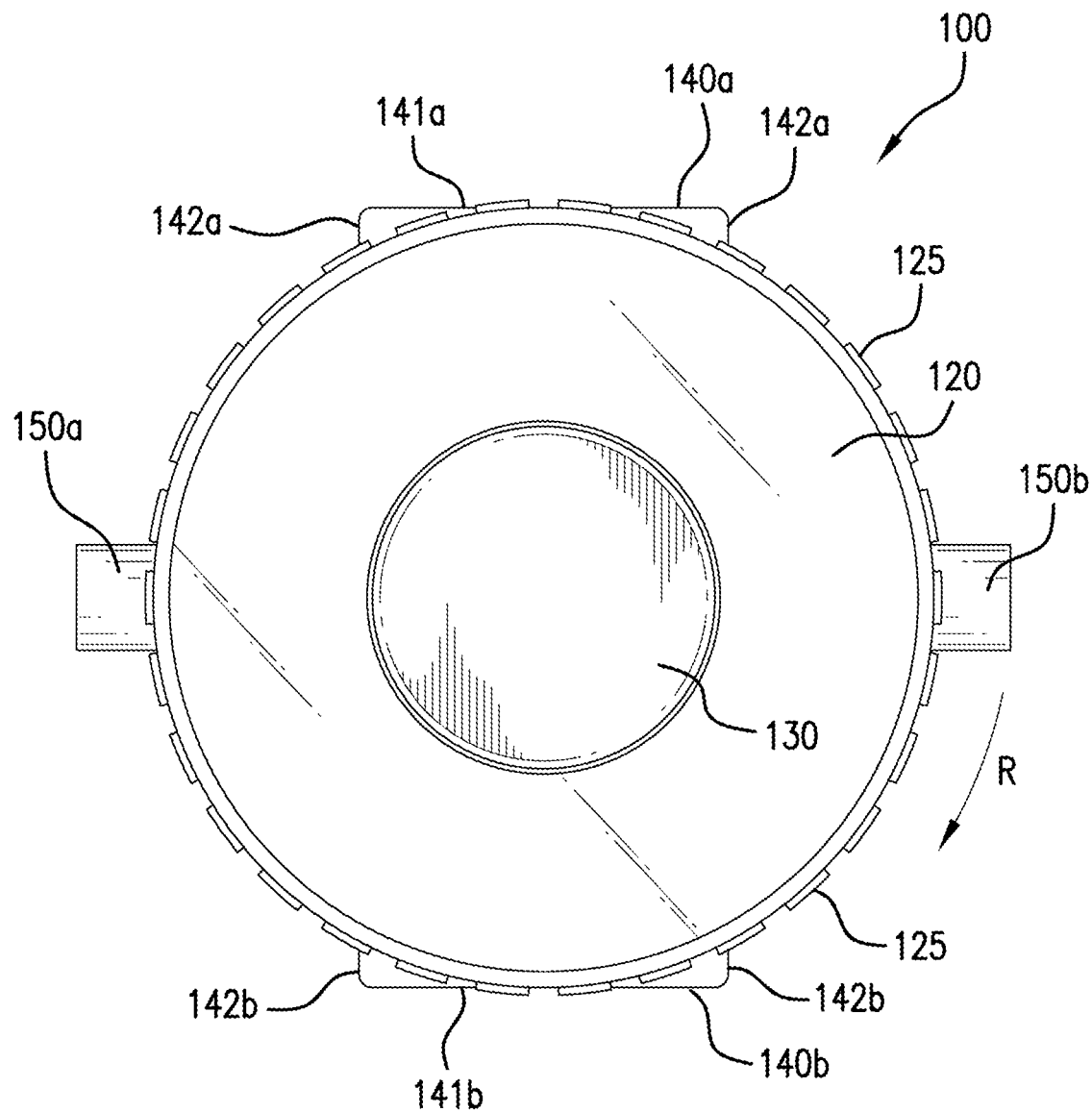
FIG. 2 is a front view of a rotating light according to an exemplary embodiment of the present disclosure.

FIG. 1 is a front perspective view of a rotating light 100 and FIG. 2 is a front view of the rotating light 100 according to the exemplary embodiments of the present disclosure. The rotating light 100 can have a base or body portion 110 which can be substantially hollow for housing one or more batteries and other elements, as will be described below. A cover portion 120 can be provided on the top of the body portion 110. In some exemplary embodiments, the cover portion 120 can be threadably engaged to the body portion 110 of the rotating light 100. In some exemplary embodiments, the cover portion 120 can be attached to the body portion 110 of the rotating light 100 by various mechanisms, such as but not limited to a clipping mechanism, a magnet or other mechanisms.

The body portion 110, along its circumference, can have a first protrusion 140a on a top portion and a second protrusion 140b on a bottom portion diametrically opposite the first protrusion 140a, as shown in FIG. 2. The first protrusion 140a can have a top wall 141a that is substantially flat and side walls 142a that are substantially flat. A middle portion of the top wall 141a of the first protrusion 140a can be substantially flush with the body portion 110, and a left and right portion of the top wall 141a of the first protrusion 140a can project outwards of the body portion 110 at opposite ends. The top wall 141a can be perpendicular to the side walls 142a. The second protrusion 140b can be similar in construction to the first protrusion 140a, having a top wall 141b and side walls 142b. This can allow the rotating light 100 to stand on a surface on either first protrusion 140a, or the second protrusion 140b, as shown in FIG. 2. The first protrusion 140a and the second protrusion 140b can be attached to the body portion 110 or can be unitary with the body portion 110.

The body portion 110, along its circumference, can further have a first projection 150a on a left portion and a second projection 150b on a right portion diametrically opposite the first projection 150a, as shown in FIG. 2. The first projection 150a and second projection 150b can project outwards of the body portion 110 at opposite ends. The first projection 150a and second projection 150b can have but are not limited to cylindrical bodies with a top flat portion. The first projection 150a and second projection 150b can be attached to the body portion 110 or can be unitary with the body portion 110.

Figure 3:
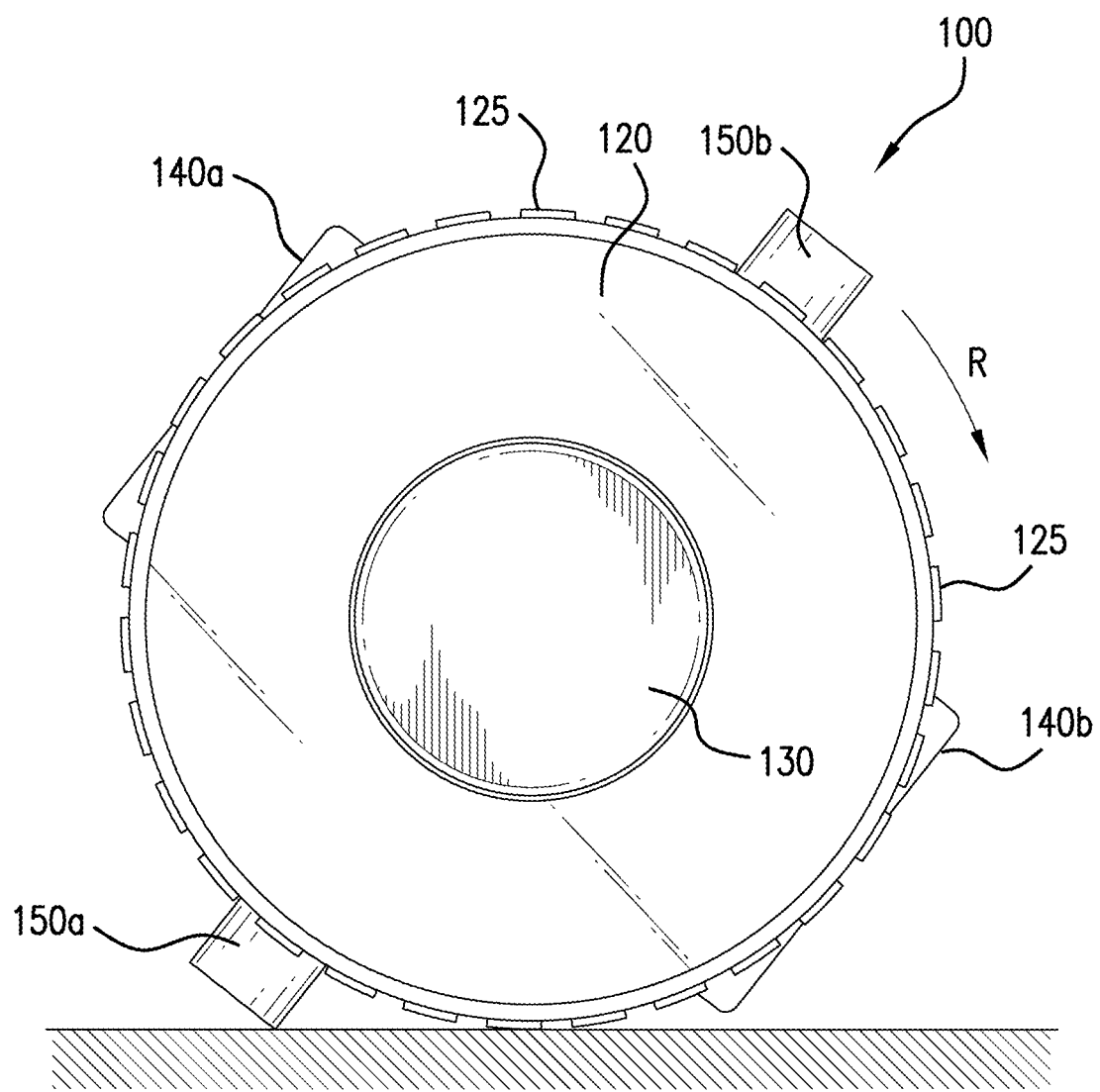
FIG. 3 is a front view of a rotating light standing on a surface according to an exemplary embodiment of the present disclosure.

In some exemplary embodiments, the first projection 150a can be approximately 90 degrees from both the first protrusion 140a and second protrusion 140b along the circumference of the body portion 110, and the second projection 150b can also be approximately 90 degrees from both the first protrusion 140a and second protrusion 140b along the circumference of the body portion 110. The first protrusion 140a, second protrusion 140b, first projection 150a and second projection 150b are located along the circumference of the body portion 110 in positions to allow the rotating light to stand on the circular portion of the body portion 110 between a protrusion and a projection such that it does not rotate or move on a flat surface. As shown in FIG. 3, a user can use the rotating light 100 and stand it on a surface to project light without the rotating light 100 turning on the circumferential portion of the body portion 110 or the cover portion 120.

In some exemplary embodiments, the rotating light 100 can have a plurality of stubs 125 along the circumference of the cover portion 120. The stubs 125 can have but are not limited to a square body as shown in FIGS. 1-3. The stubs 125 can be integral with the cover portion 120. If the rotating light 100 is tipped or moved, the plurality of stubs 125 can control the rotating light 100 so that it does not roll or turn. The plurality of stubs 125 also help a user grip the circumferential portion of the cover portion 120 to turn the cover portion 120 in a direction R (e.g., clockwise) to turn the rotating light on, and in a reverse direction (e.g., counter-clockwise) to turn the rotating light off, as will be described below.

A circular enclosure 130 can be provided along a center of the cover portion 120, which can be transparent and made of glass or plastic or a composite thereof. One or more light-emitting diodes (LEDs) can be provided (as will be described below) to project light from within the circular enclosure. In some exemplary embodiments, the LEDs can be provided on a printed circuit board provided within the circular enclosure 130. In some exemplary embodiments, the surface of the circular enclosure 130 can be raised so that it projects upward with respect to the body portion 120, as shown in FIG. 1.

Figure 4:
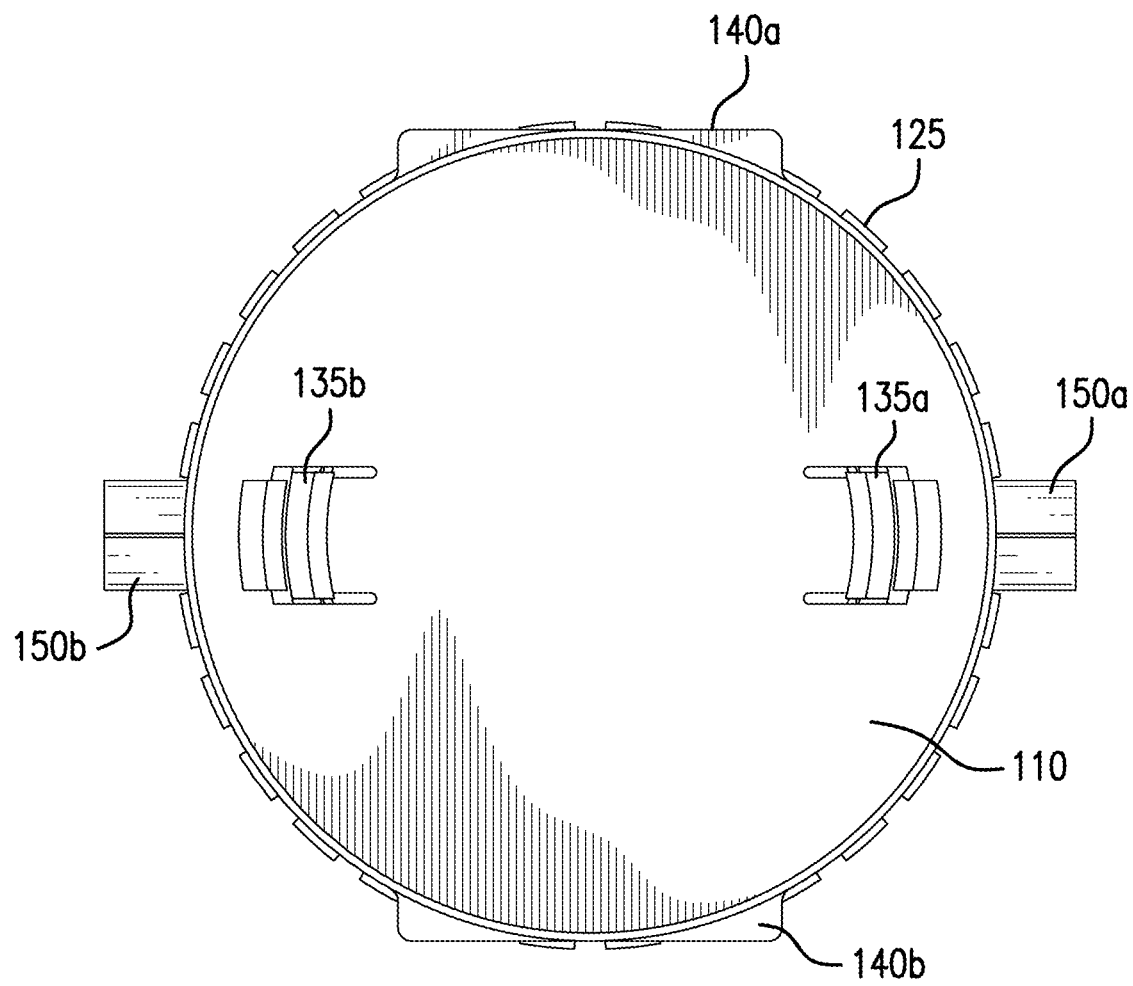
FIG. 4 is a rear view of a rotating light according to an exemplary embodiment of the present disclosure.

FIG. 4 is an illustration of a rear view of the rotating light 100 according to the exemplary embodiments of the present disclosure. The body portion 110 can have retaining elements 135a and 135b as will be discussed below. Preferably, a retaining element 135a is provided adjacent to the first projection 150a, and a retaining element 135b is provided adjacent to the second projection 150b.

Figure 5:
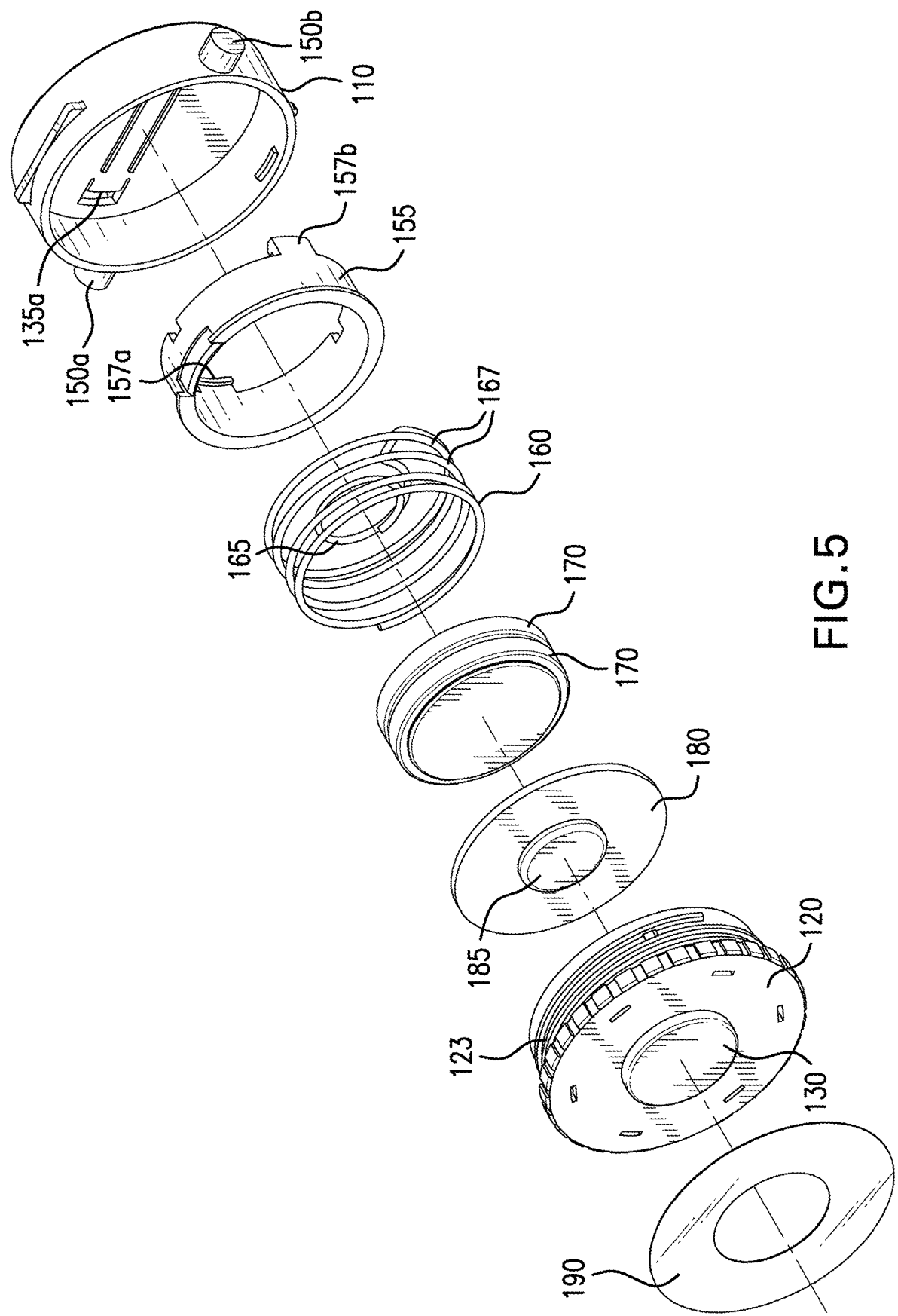
FIG. 5 is an exploded view of a rotating light according to an exemplary embodiment of the present disclosure.

FIG. 5 is an illustration of an exploded view of the rotating light 100 according to the exemplary embodiments of the present disclosure. A body portion 110 is provided that can comprise a plastic hollow body as described above. The interior of the body portion 110 can have a threaded body to receive the threaded portion of the cover portion 120, as will be described below. An inner body 155 is provided, that can also be comprised of a plastic material, which fits within the body portion 110. The inner body 155 can have a slightly smaller circumference than the body portion 110. The inner body 155 can have an open front end and open back end. A rear portion of the inner body 155 can have projections 157a and 157b that correspond to the retaining elements 135a and 135b, respectively, to attach the inner body 155 to the body portion 110. For example, the projection 157a fits within the retaining element 135a of the body portion 110, and the projection 157b fits within the retaining element 135b of the body portion 110.

A metal tension spring 160 is provided that has a back portion 165 and coils 167. The back portion 165 is placed behind the inner body 155 and presses against the interior of the body portion 110. Coils 167 are provided around the body of the inner body 155 once the spring 160 and inner body 155 are provided within the body portion 110. One or more batteries 170 are provided that fit within the interior of the inner body 155. In some exemplary embodiments, the batteries 170 can be but are not limited to disc-shaped batteries. In some exemplary embodiments, the batteries can be but are not limited to lithium-ion batteries. A printed circuit board (PCB) 180 having one or more LEDs 185 (or other type of lighting mechanism) can be provided having a disc shape. The PCB 180 can have a contact on a rear portion to press against the battery 170 and the LEDs 185 can be provided on a front portion. The front portion of the PCB 180 is attached to the interior of the cover portion 120, such as by an adhesive. The cover portion 120 can have a threaded body 123 that is received within the interior space of the body portion 110, such that the inner body 155, spring 160, batteries 170 and PCB 180 are all placed within the body portion 110. The threaded body 123 surrounds the circumference of the PCB 180, batteries 170, spring 160 and inner body 155, and is received inside of the body portion 110. A decal 190 can be applied to the front surface of the cover portion 120, which can have a logo, name and/or other indicia printed on it.

The rotating light is constructed such that a circuit is formed by the PCB 180, batteries 170 and spring 160. The battery 170 is pressed against the back portion 165 of the tension spring 160. A front portion of the tension spring 160 is pressed against the rear portion of the PCB 180, which completes the circuit to light the LEDs 185. Because the PCB 180 is adhered to the interior of the cover portion 120, when the cover portion 120 is turned in a direction R (e.g., clockwise), the PCB 180 is pressed against the spring 160 and batteries 170 to complete the circuit. When the cover portion 120 is turned in a reverse direction (e.g., counter-clockwise), the PCB 180 disengages from the tension spring 160 and the batteries 170 to break the circuit, turning the LEDs 185 off. In some exemplary embodiments, a dimming function can be provided such that the more the cover portion 120 is turned clockwise, the power from the batteries 170 to the LEDs 185 is greater such that the LEDs 185 turn brighter, and when the cover portion is turned counter-clockwise, the LEDs 185 turn less bright.

Figure 6:
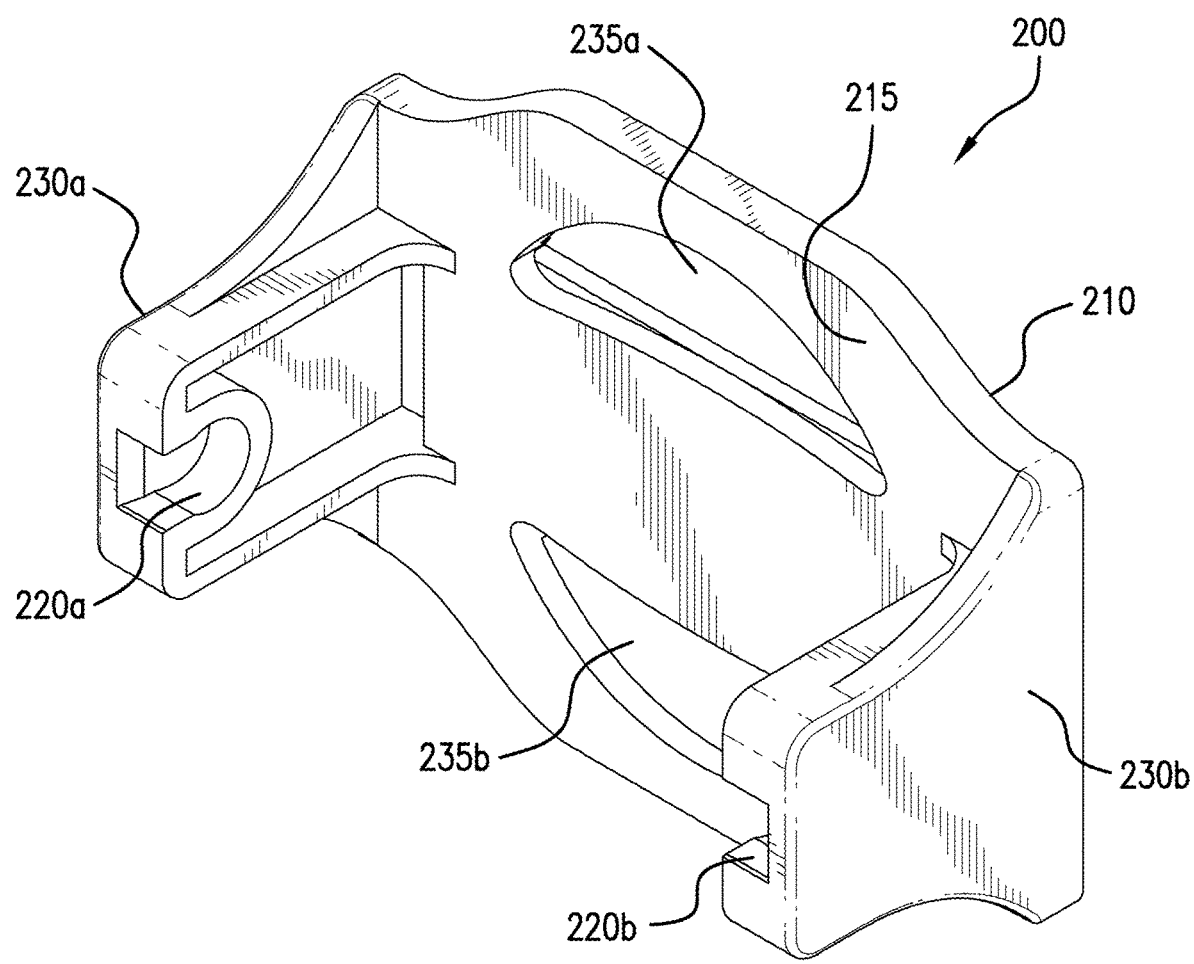
FIG. 6 is an illustration of a holder that can hold a rotating light according to an exemplary embodiment of the present disclosure.

FIG. 6 is an illustration of a holder that can hold the rotating light 100 according to the exemplary embodiments of the present disclosure. The holder 200 can have a body portion 210, including a rear portion 215 and a left wing 230a and a right wing 230b, both extending from the rear portion 215. The rear portion 215 can have cutout 235a on a top portion and cutout 235b on a bottom portion. Left wing 230a can have a recess 220a and right wing 230b can have a recess 220b. The recess 220a can engage the first projection 150a of the rotating light 100, and recess 220b can engage the second projection 150b of the rotating light 100, as will be described below.

Figure 7:
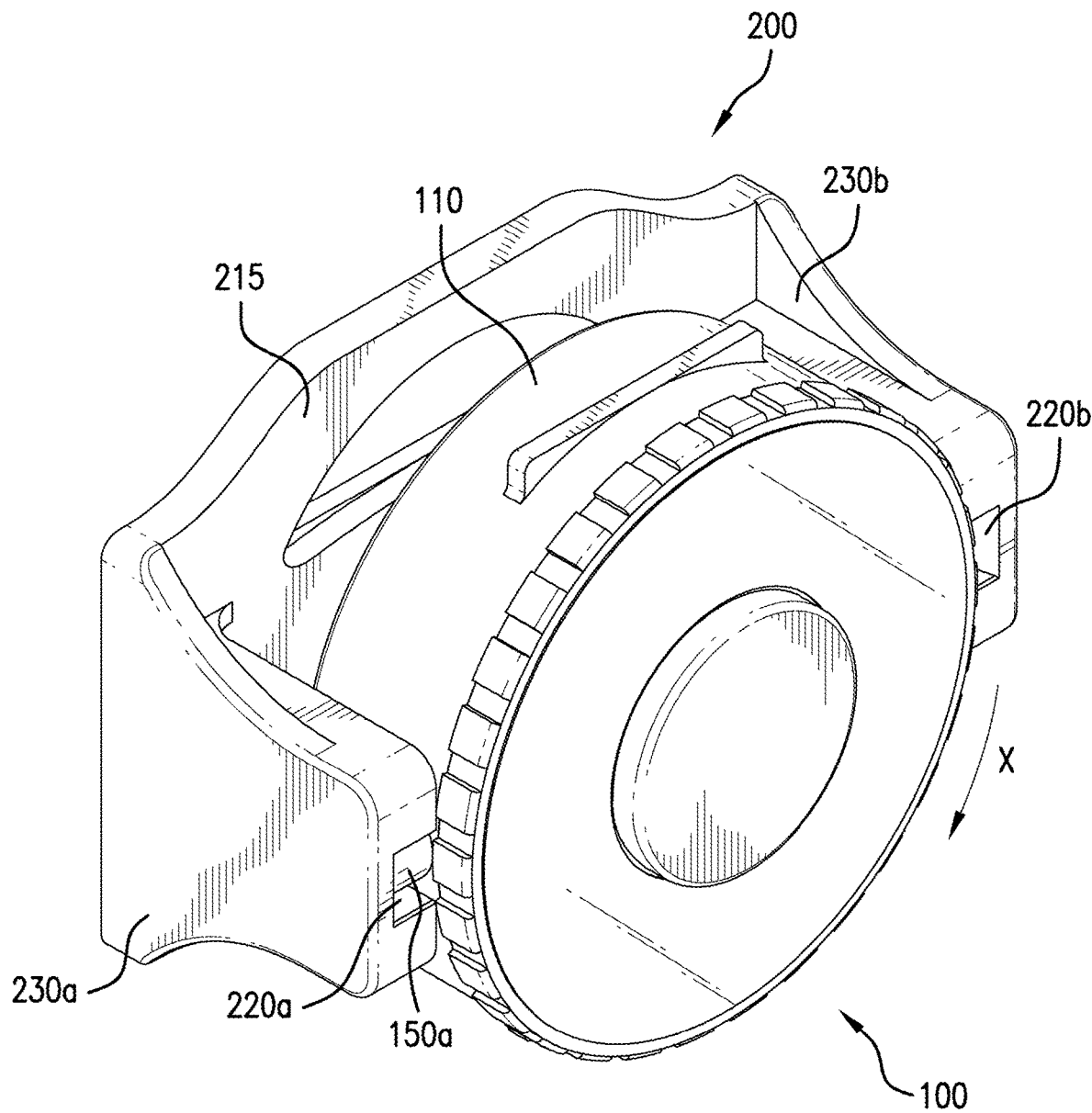
FIGS. 7-9 are illustrations of a rotating light within a holder 200 according to an exemplary embodiment of the present disclosure.
Figure 8A:
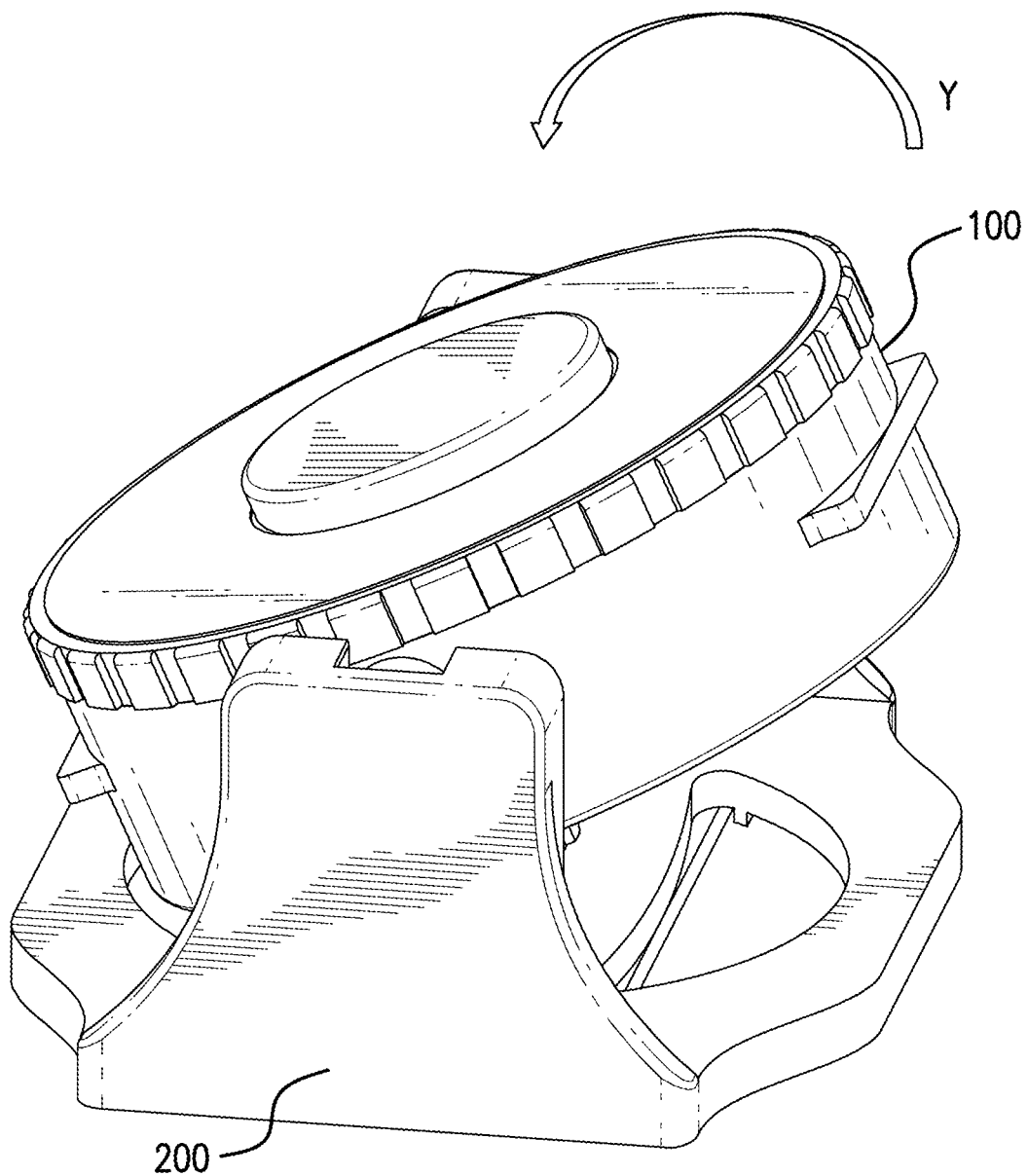
Figure 8B:
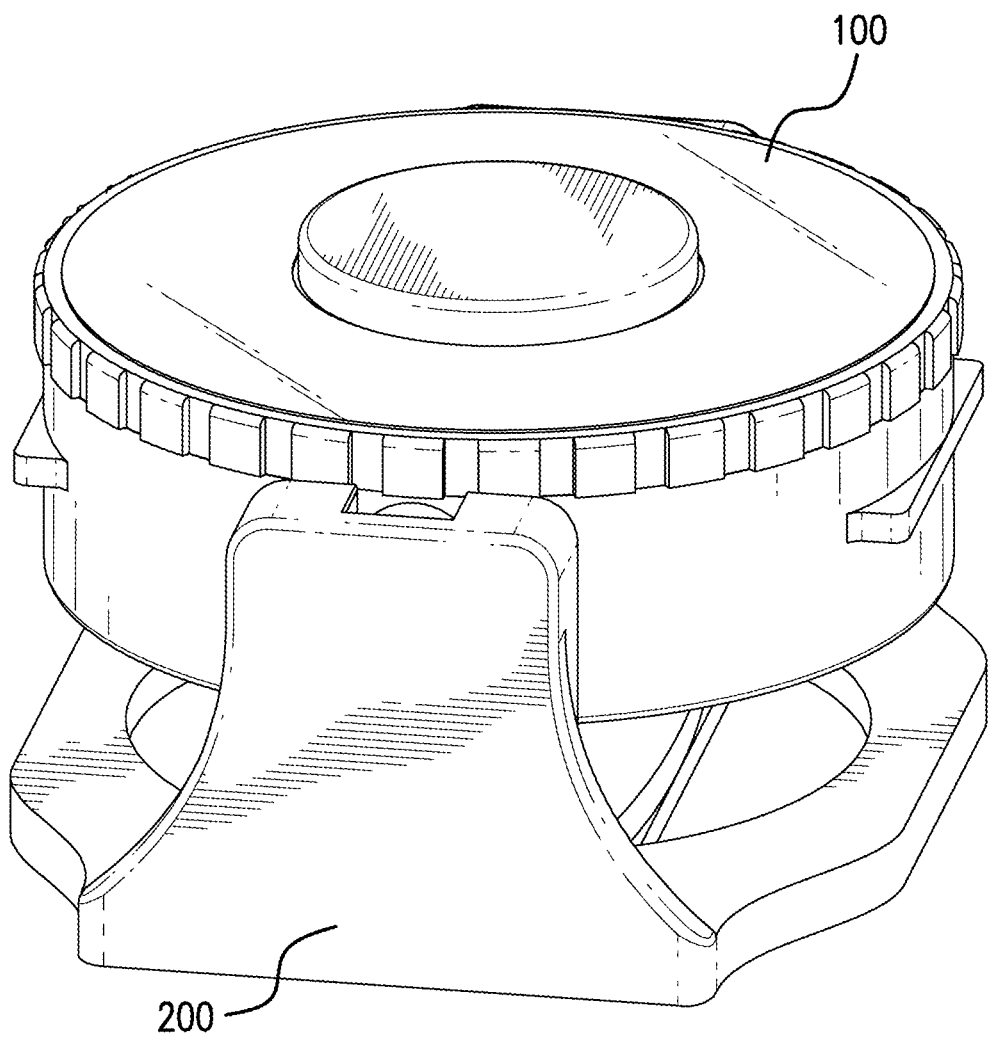
Figure 8C:
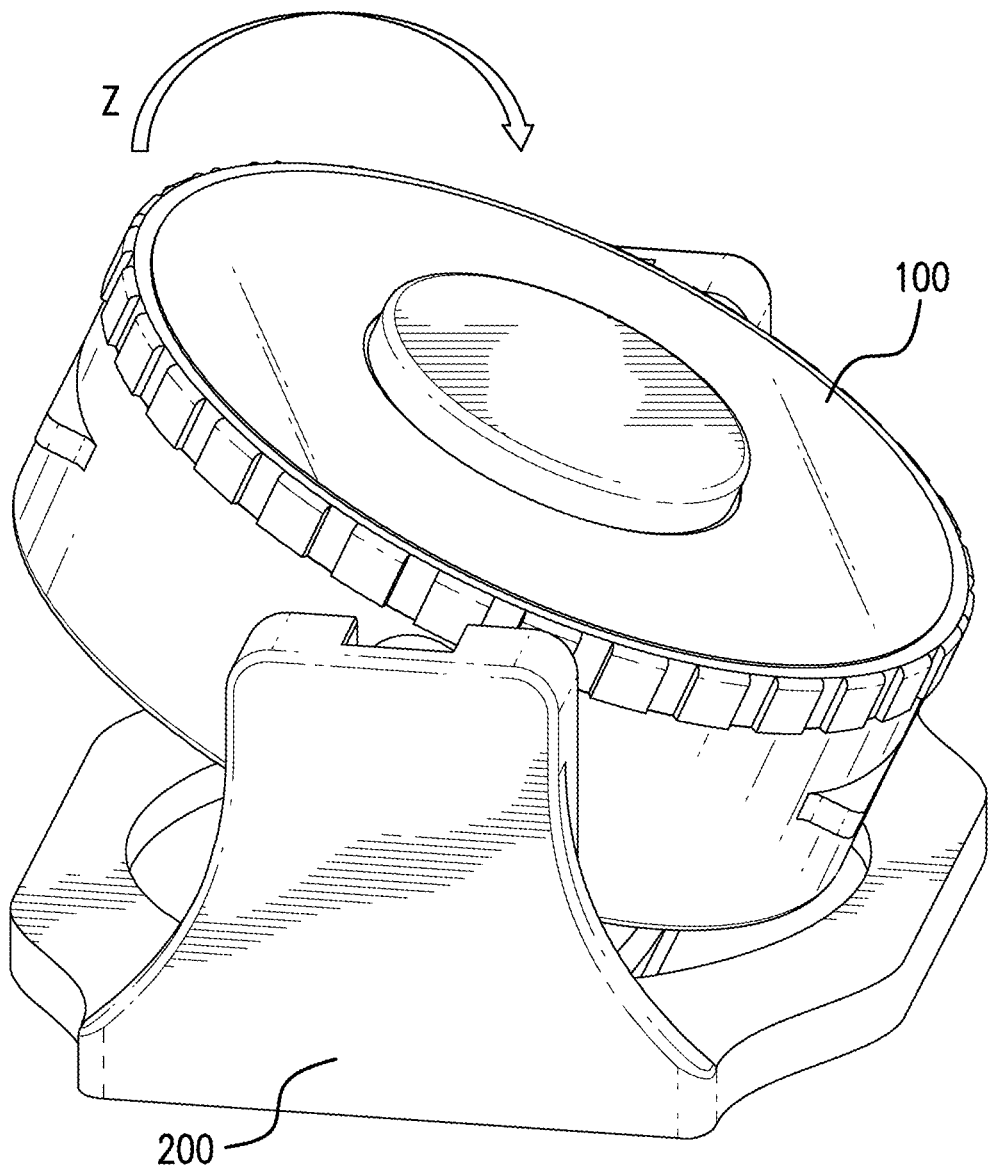
Figure 9:
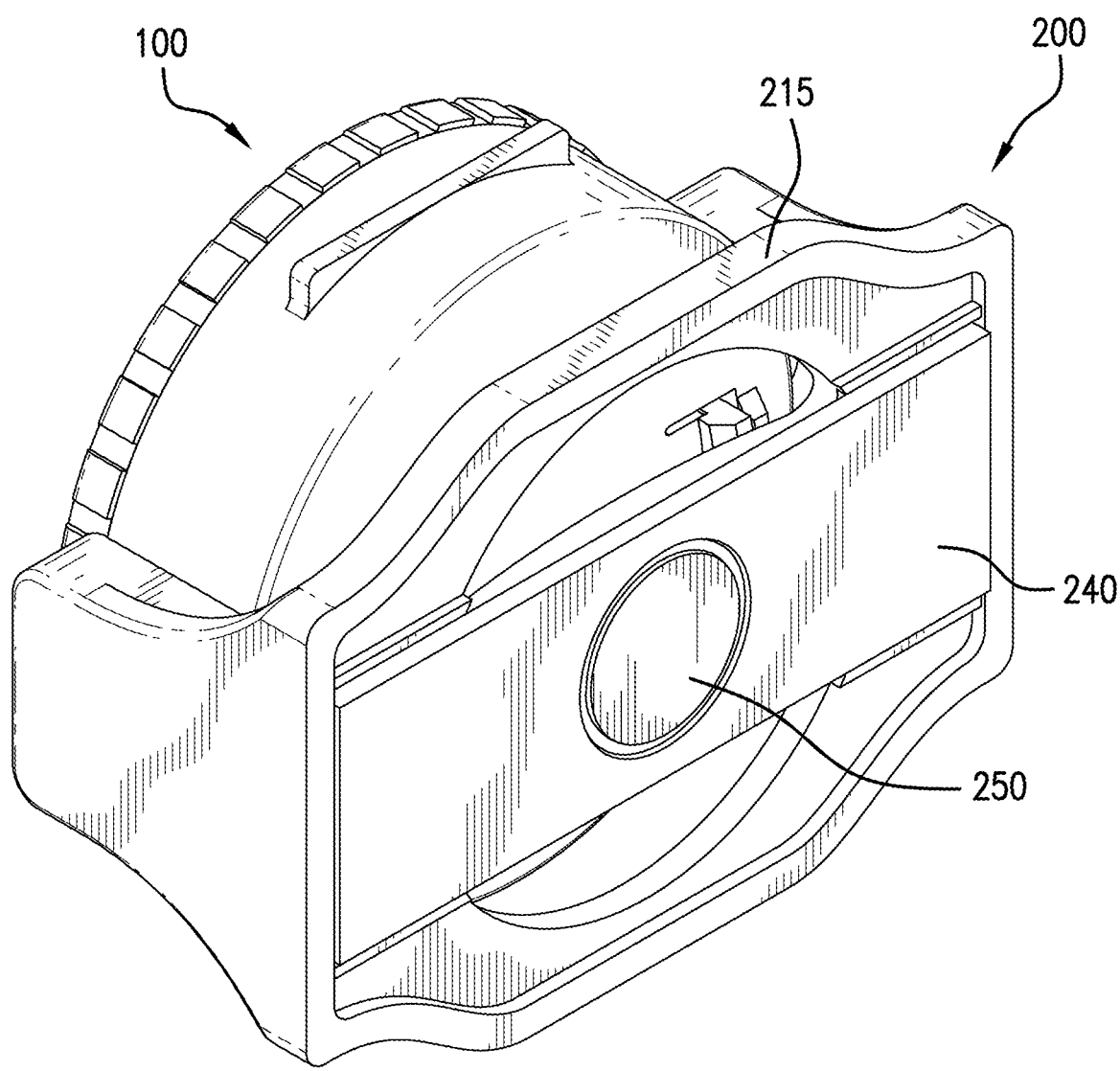

FIGS. 7-9 are illustrations of the rotating light 100 within the holder 200 according to the exemplary embodiments of the present disclosure. As shown in FIG. 7, the projections 150a and 150b are tightly secured within the recesses 220a and 220b, respectively, so that the rotating light 100 does not come out unless a little force is applied to pull the rotating light 100 out. A certain distance is provided between the rear portion 215 and the rear portion of the body portion 110 to allow the rotating light 100 to swivel, as explained below. As the recesses 220a and 220b are configured to engage the cylindrical portions of the projections 150a and 150b, respectively, to hold the rotating light 100 in place, it allows the cover portion 120 to be turned in a direction X to, e.g., turn on the light and in a reverse direction to, e.g., turn off the light.

For example, as shown in FIGS. 8(a)-8(c), the rotating light 100 can turn in both directions on the holder 200. As shown in FIG. 8(a), the rotating light 100 can turn in a direction Y within the holder 200 ranging from approximately 0 to 45 degrees, and preferably approximately 30 degrees. As shown in FIG. 8(b), the rotating light 100 can be parallel to the rear 215 of the holder 200 and surface the holder 200 is on. As shown in FIG. 8(c), the rotating light 100 can turn in a direction Z within the holder 200 ranging from approximately 0 to 45 degrees, and preferably approximately 30 degrees.

In some exemplary embodiments, as shown in FIG. 9, on the back portion of the rear portion 215, an adhesive 240 can be provided with a removable film to adhere the holder 200 on a surface, such as a wall or ceiling. The rotating light 100 can then be mounted on the holder 200 and angled as required. In some exemplary embodiments, a magnet 250 can be provided to attach the holder 200 to a magnetic surface for easy attachment and detachment.

Various other considerations can also be addressed in the exemplary applications described according to the exemplary embodiments of the present disclosure. For example, various materials may be used to construct the elements described in the figures. Various sizes and dimensions of the rotating light 100 and holder 200, and of the shapes and designs for the rotating light 100 and holder 200 can also be provided, and are not limited by the sizes, dimensions, shapes and designs described above and in the figures.

Figure 10:
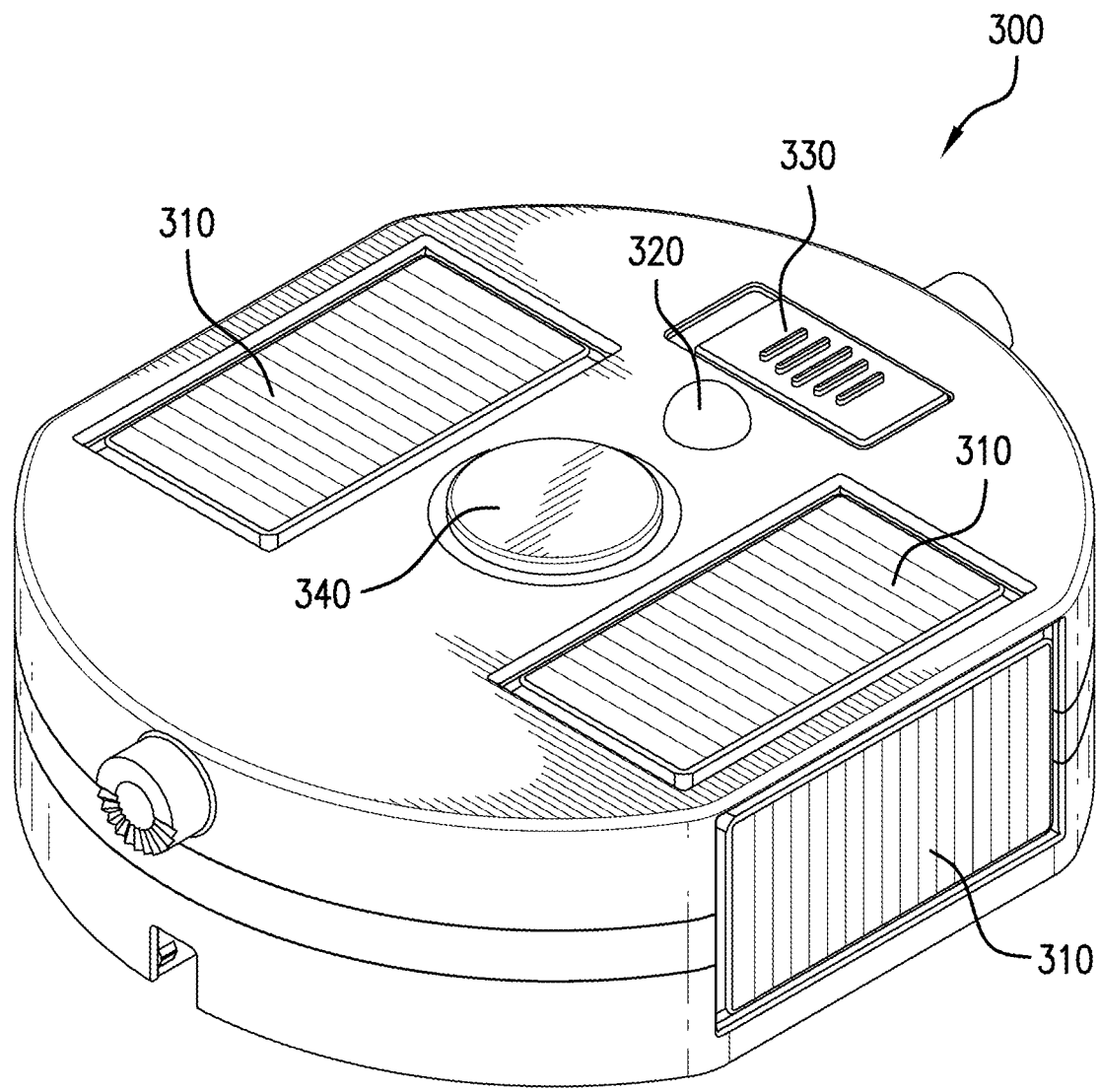
FIG. 10 is a front perspective view of a rotating light having a solar panel portion according to an exemplary embodiment of the present disclosure.

For example, in some exemplary embodiments, as shown in FIGS. 10-13, various modifications to the rotating light 100 and holder 200 can be made. For example, as shown in FIG. 10, the rotating light 300 can have solar panels 310 provided on a body of the rotating light 200, such as the top surface and one or more side surfaces. The solar panels 310 can charge the one or more batteries within the rotating light 300, and the rotating light 300 can be turned on and off similar to the embodiments described above. In some exemplary embodiments, a motion and light sensor 320 can be provided on a top surface of the rotating light 300, such that the LED 340 turns on if motion is detected and/or light levels are below a certain threshold (e.g., to turn on at night or in dark conditions). These elements can be provided with or without the solar panels 310. A switch 330 can also be provided to turn the LED 340 on or off, as well as an "AUTO" position where the LED 340 turns on if motion is detected and/or light levels are below a certain threshold. In some exemplary embodiments, a dimmer (not shown) can also be provided on a surface of the rotating light 300, or can be incorporated into the switch 330.

Figure 11:
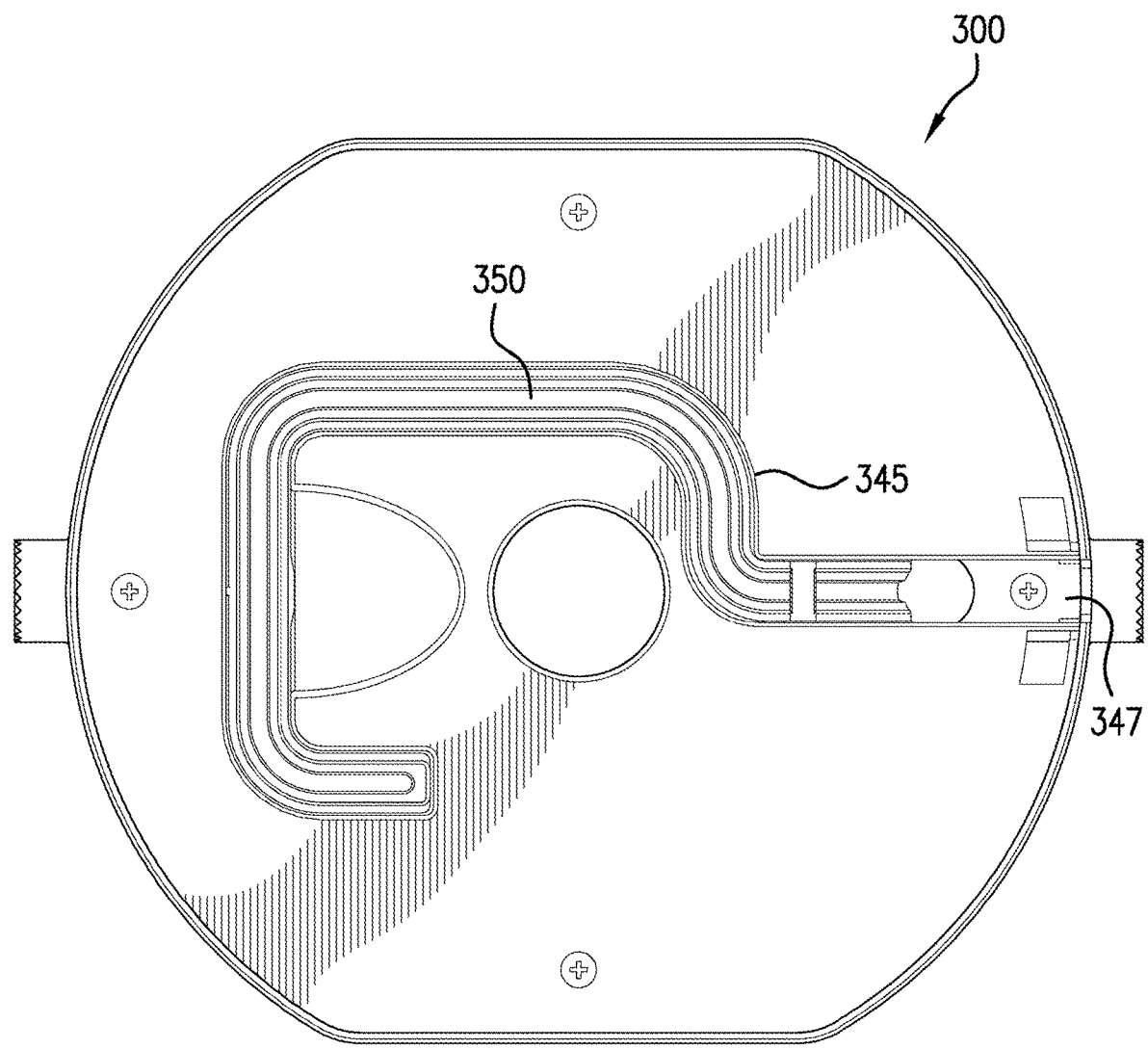
FIG. 11 is a rear view of a rotating light according to an exemplary embodiment of the present disclosure.
Figure 12:
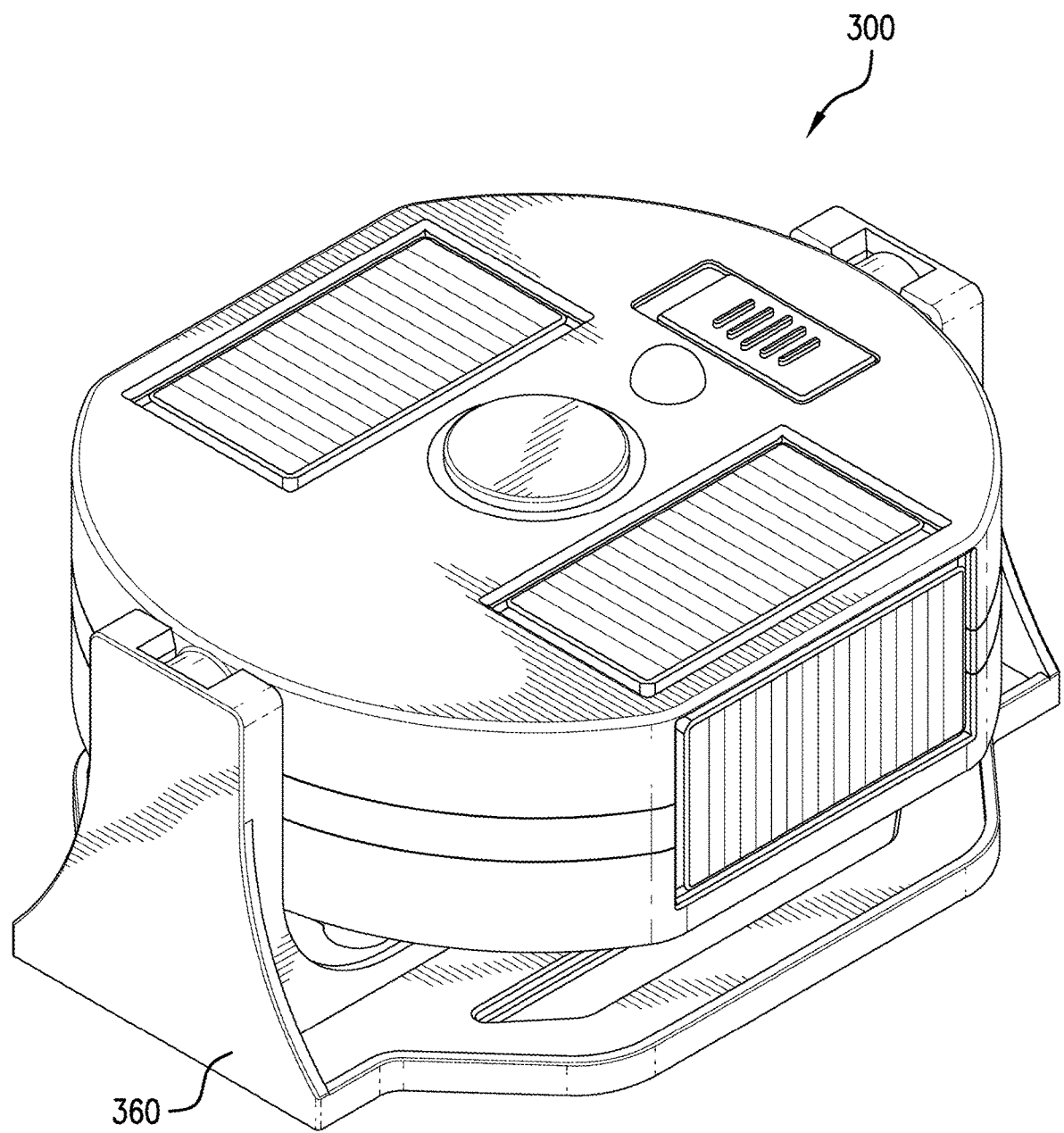
FIG. 12 is an illustration of a holder that can hold a rotating light having a solar panel portion according to an exemplary embodiment of the present disclosure.
Figure 13:
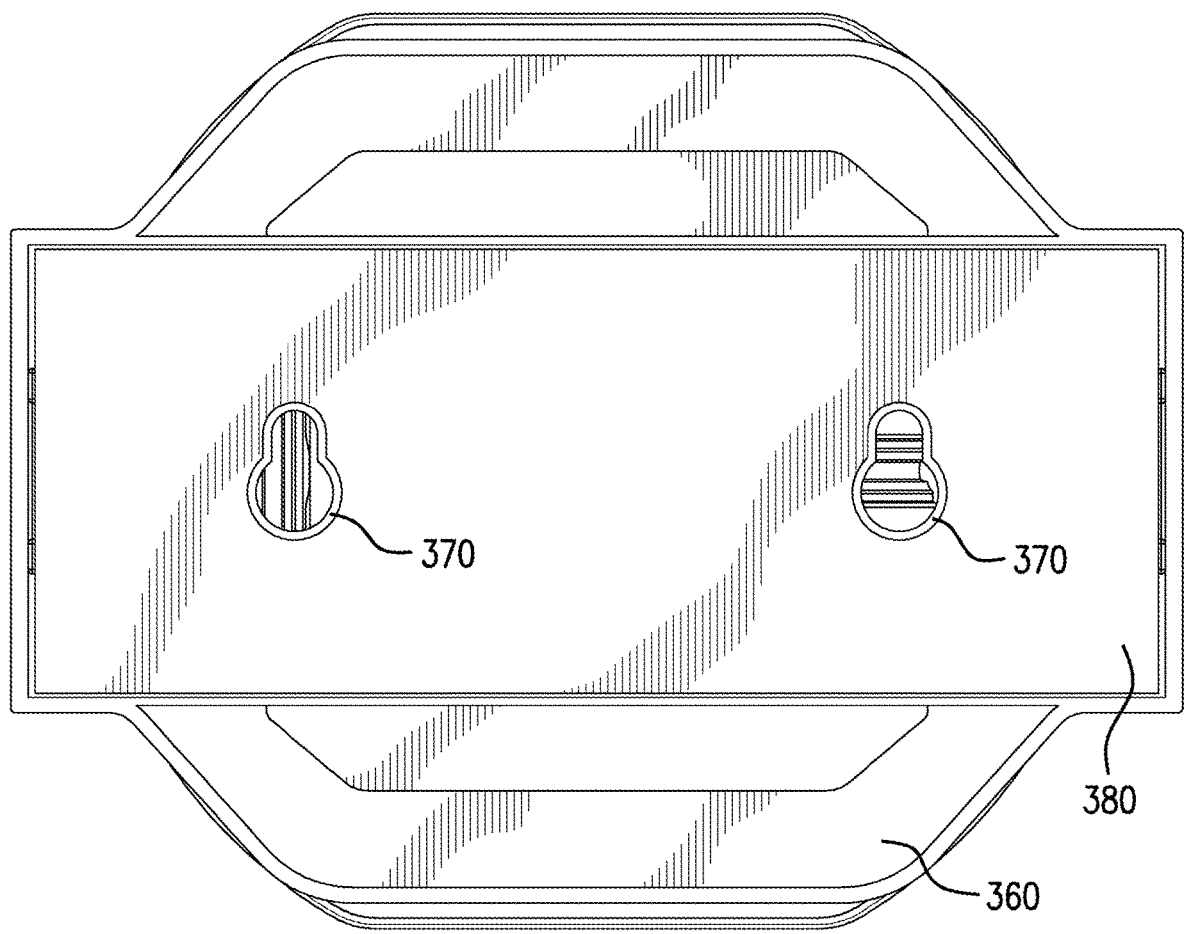
FIG. 13 is a rear view of a holder that can hold a rotating light according to an exemplary embodiment of the present disclosure.

In some exemplary embodiments, as shown in FIG. 11, a recess 345 can be provided on a rear portion of the rotating light 300 configured to secure a hook 350 within the recess 345. The recess 345 can have a shape of the hook to fit the hook such that the hook is substantially flush with the rear portion of the rotating light 100. The hook 350 can be rotated outwards on its base 347 to hang the rotating light on, e.g., a wall. The recess 345 extends through the body of the rear portion such that when the hook 350 is in an outward direction, the base 347 of the hook 350 is still within the recess 345 such that the rotating light 300 and hook 350 would be flush against the wall. As shown in FIG. 12, the rotating light 300 could be provided within a holder 360 similar to the embodiments described above. As shown in FIG. 13, an adhesive 380 could be provided on a rear portion of the holder 360 as described above, as well as a magnet (not shown). Additionally, recesses 370 could also be provided to hang on a wall using thumb tacks or nails, for example.

Various advantages can be provided based on the exemplary embodiments described above. For example, the rotating light can be used as a portable light and removable from the holder and placed on any surface to provide light as needed. The rotating light can be used indoors or outdoors, and can be used as an accent light with or without the holder, and turned on as needed to shine light on an object, such as a photo, painting, statue or other object a user desires to shine light on. The holder can be attached to any surface using any mechanism, such as but not limited to an adhesive, magnet or nails.

The words "ranging", "ranges from", "ranges between" and other similar notations, are used herein interchangeably and are meant to include the first and second indicated numbers and all the fractional and integral numerals there between. It should be noted that where various embodiments are described by using a given range, the range is given as such merely for convenience and brevity and should not be construed as an inflexible limitation on the scope of the disclosure. Accordingly, the description of a range should be considered to have specifically disclosed all the possible sub-ranges as well as individual numerical values within that range.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, manufacture and methods which, although not explicitly shown or described herein, embody the principles of the disclosure and are thus within the spirit and scope of the disclosure.

What is claimed is:

1. A light set, comprising:
 a light portion comprising:
  a body configured to retain one or more batteries; and
  a printed circuit board in the body containing one or more light-emitting diodes configured to emit light from a top portion of the body;
 a holder for holding the light portion, comprising:
  a rear portion having a front wall, a back wall, a top, a middle, a bottom, a first side and a second side opposite the first side, the middle extending from the first side to the second side;
  a left wing extending from the first side of the front wall of the rear portion, the left wing being perpendicular to the front wall of the rear portion; and
  a right wing extending from the second side of the front wall of the rear portion, the right wing being perpendicular to the front wall of the rear portion;
  a first cutout at the top of the rear portion between the left wing and the right wing that extends from the front wall to the back wall;
  a second cutout at the bottom of the rear portion between the left wing and the right wing that extends from the front wall to the back wall, wherein the middle of the rear portion separates the first cutout from the second cutout;
 wherein the left wing is engaged with a first side of the body of the light portion and the right wing is engaged with a second side of the body of the light portion to hold the light portion in the holder; and
 an adhesive including a removable film provided on the back wall of the holder.

2. The light set of claim 1, wherein the light portion is configured to be removable from the holder by separating the light portion from the left wing and the right wing of the holder.

3. The light set of claim 1, wherein a distance is provided between the body of the light portion and the rear portion of the holder such that the light portion can turn when positioned within the holder.

4. The light set of claim 3, wherein the light portion can turn up to 30 degrees on either side when positioned within the holder.

5. The light set of claim 3, wherein the light portion is configured to be tilted with respect to the holder, such that the light emitting from the top of the body can be angled with respect to the holder.

6. The light set of claim 1, wherein the adhesive is provided at the middle of the rear portion of the holder between the first cutout and the second cutout.

7. The light set of claim 1, wherein the holder and light portion are engaged through one or more projections and recesses to secure the light portion to the left wing and right wing of the holder.

8. The light set of claim 1, further comprising:
a circular enclosure on the top portion of the body of the light portion through which the light is emitted.

9. The light set of claim 1, wherein the left wing has an outer wall and an inner wall, the inner wall having a first opening at a top portion of the left wing leading into a first recess that does not project into the outer wall, and the right wing has an outer wall and an inner wall, the inner wall having a second opening at a top portion of the right wing leading into a second recess that does not project into the outer wall.

10. The light set of claim 9, wherein the light portion has a first projection extending outward from an outer surface of the body configured to engage the first recess, and a second projection extending outward from an outer surface of the body configured to engage the second recess, the second projection being diametrically opposite to the first projection.

11. A light set, comprising:
a light portion comprising:
a body configured to retain one or more batteries;
a printed circuit board in the body containing one or more light-emitting diodes configured to emit light from a top of the body;
a holder for holding the light portion, comprising:
a rear portion having a front wall, a back wall, a top, a middle, a bottom, a first side and a second side opposite the first side, the middle extending from the first side to the second side;
a left wing extending from the first side of the front wall of the rear portion, the left wing being perpendicular to the front wall of the rear portion; and
a right wing extending from the second side of the front wall of the rear portion, the right wing being perpendicular to the front wall of the rear portion;
a first cutout at the top of the rear portion between the left wing and the right wing that extends from the front wall to the back wall;
a second cutout at the bottom of the rear portion between the left wing and the right wing that extends from the front wall to the back wall, wherein the middle of the rear portion separates the first cutout from the second cutout;
wherein the left wing is engaged with a first side of the body of the light portion and the right wing is engaged with a second side of the body of the light portion to hold the light portion in the holder; and
one or more recesses on the back wall of the holder to hang the holder on a wall.

12. The light set of claim 11, further comprising:
an adhesive including a removable film provided on the back wall of the holder.

13. The light set of claim 12, wherein the adhesive is provided at the middle of the rear portion of the holder between the first cutout and the second cutout.

14. The light set of claim 11, wherein a distance is provided between the body portion of the light portion and the rear portion of the holder such that the light portion can turn when positioned within the holder.

15. The light set of claim 14, wherein the light portion can turn up to 30 degrees on either side when positioned within the holder.

16. The light set of claim 11, wherein the light portion is configured to be tilted with respect to the holder, such that the light emitting from the top of the body portion can be angled with respect to the holder.

17. The light set of claim 11, wherein the light portion is configured to be removable from the holder by separating the light portion from the left wing and the right wing of the holder.

18. The light set of claim 11, wherein the one or more recesses are provided at the middle of the rear portion of the holder between the first cutout and the second cutout.

19. The light set of claim 11, wherein the holder and light portion are engaged through one or more projections and recesses to secure the light portion to the left wing and right wing of the holder.

20. The light set of claim 11, wherein the left wing has an outer wall and an inner wall, the inner wall having a first opening at a top portion of the left wing leading into a first recess that does not project into the outer wall, and the right wing has an outer wall and an inner wall, the inner wall having a second opening at a top portion of the right wing leading into a second recess that does not project into the outer wall.

* * * * *

EX PARTE REEXAMINATION CERTIFICATE (13076th)
United States Patent
Saboo

(10) Number: US 12,146,641 C1
(45) Certificate Issued: Nov. 3, 2025

(54) ROTATING LIGHT

(71) Applicant: West Coast Imports, Inc., Commerce, CA (US)

(72) Inventor: Vinay Saboo, Commerce, CA (US)

(73) Assignee: WEST COAST IMPORTS, INC., Commerce, CA (US)

Reexamination Request:
  No. 90/019,763, Dec. 12, 2024

Reexamination Certificate for:
  Patent No.: 12,146,641
  Issued: Nov. 19, 2024
  Appl. No.: 18/217,917
  Filed: Jul. 3, 2023

Related U.S. Application Data

(63) Continuation of application No. 17/895,559, filed on Aug. 25, 2022, now Pat. No. 11,692,695, which is a continuation of application No. 17/296,579, filed as application No. PCT/US2019/063330 on Nov. 26, 2019, now Pat. No. 11,428,390.

(60) Provisional application No. 62/804,549, filed on Feb. 12, 2019.

(51) Int. Cl.
  *F21V 21/30* (2006.01)
  *F21L 4/00* (2006.01)
  *F21S 9/03* (2006.01)
  *F21V 23/04* (2006.01)
  *F21L 4/08* (2006.01)
  *F21V 15/01* (2006.01)
  *F21V 21/08* (2006.01)
  *F21Y 115/10* (2016.01)

(52) U.S. Cl.
  CPC .............. *F21V 21/30* (2013.01); *F21L 4/005* (2013.01); *F21S 9/037* (2013.01); *F21V 23/0414* (2013.01); *F21V 23/0471* (2013.01); *F21L 4/085* (2013.01); *F21V 15/01* (2013.01); *F21V 21/08* (2013.01); *F21Y 2115/10* (2016.08); *Y02B 20/72* (2013.01)

(58) Field of Classification Search
  None
  See application file for complete search history.

(56) References Cited

To view the complete listing of prior art documents cited during the proceeding for Reexamination Control Number 90/019,763, please refer to the USPTO's Patent Electronic System.

*Primary Examiner* — Peter C English

(57) ABSTRACT

Exemplary embodiments of a light set are provided, including a light portion having a body portion configured to retain one or more batteries, a printed circuit board within the body portion containing one or more light-emitting diodes, and a first projection and a second projection extending outward from an outer surface of the body portion. A holder is provided for holding the light portion, including a rear portion, a left wing extending from and perpendicular to the rear portion, the left wing having an outer wall and an inner wall, and a right wing extending from and perpendicular to the rear portion, the right wing having an outer wall and an inner wall.

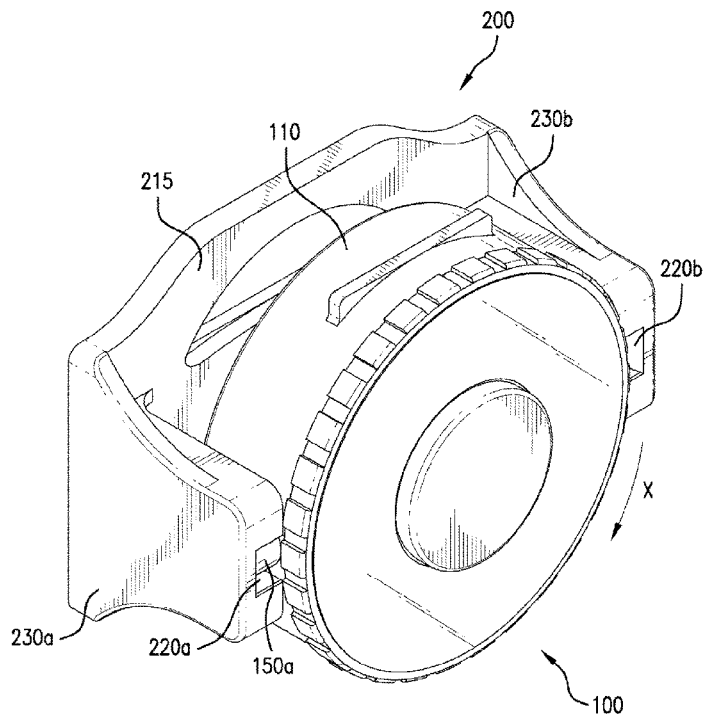

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-20 are cancelled.

* * * * *